Aug. 16, 1938.   F. O. GUTH   2,127,213
PORTABLE STARTING STALL FOR RACE TRACKS
Filed March 4, 1935   3 Sheets-Sheet 2
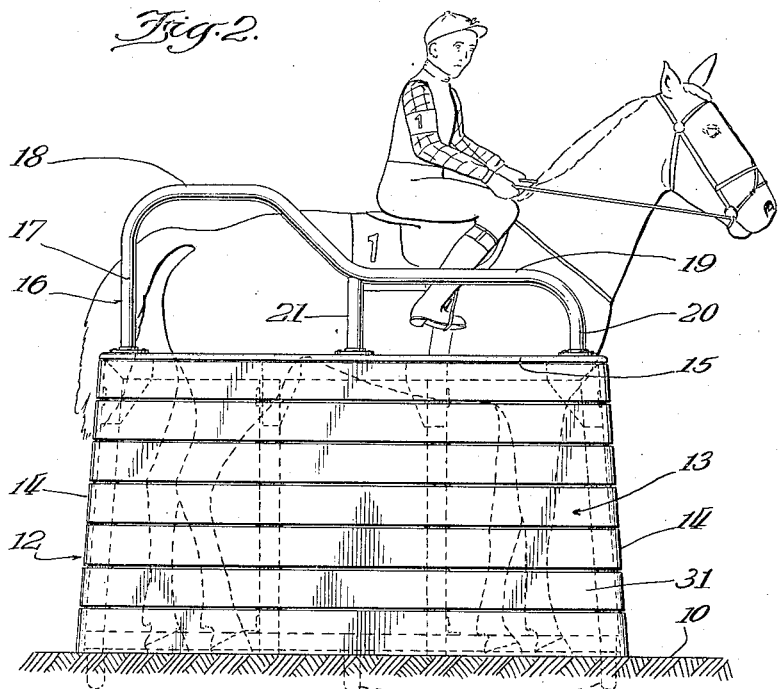
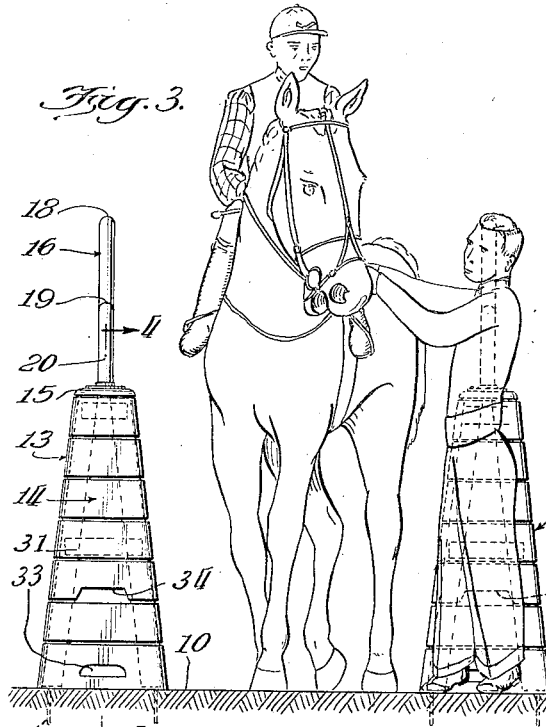
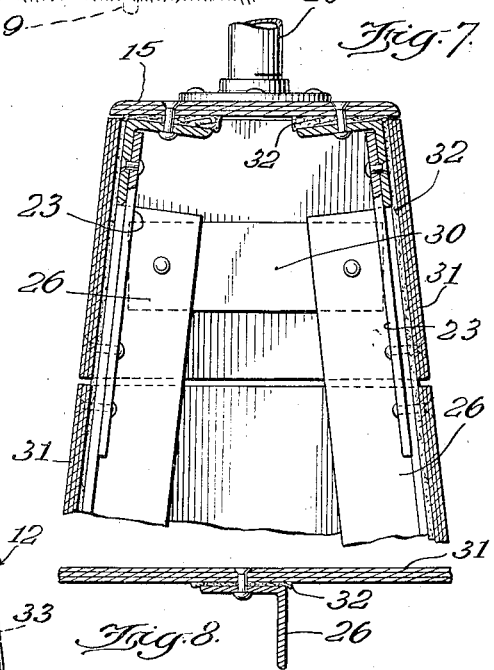
Inventor:
Fred Otto Guth
By Williams, Bradbury, McCaleb & Hinkle
Attys.

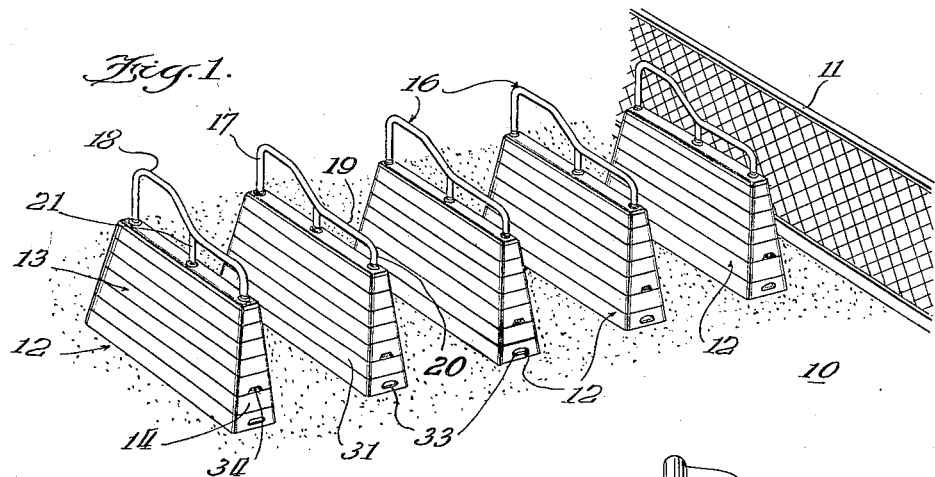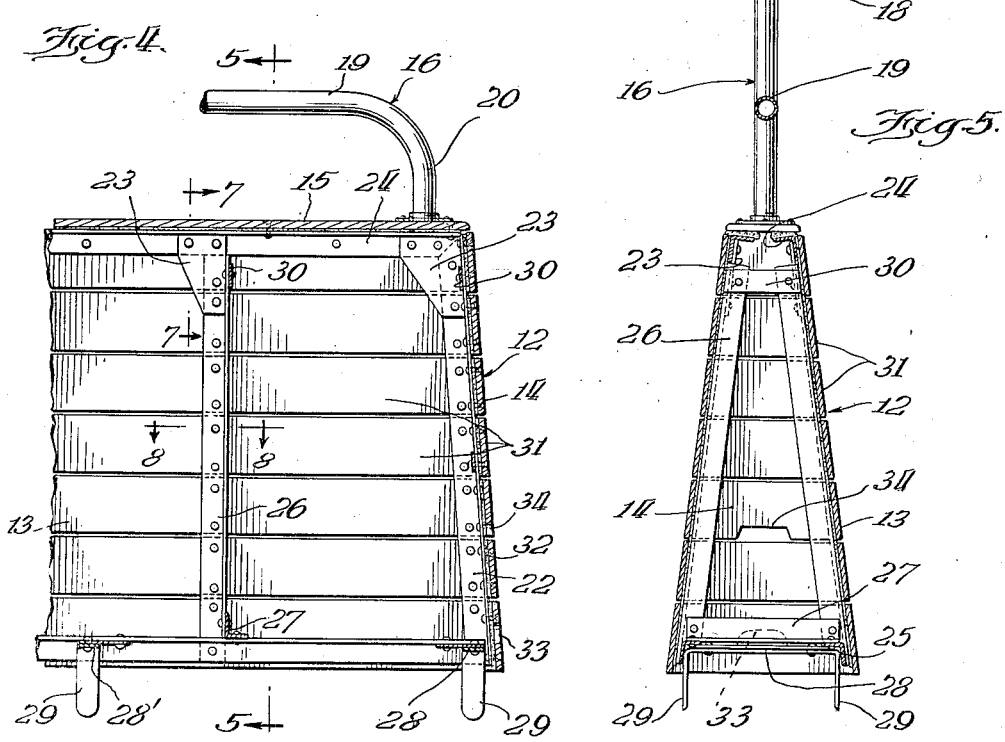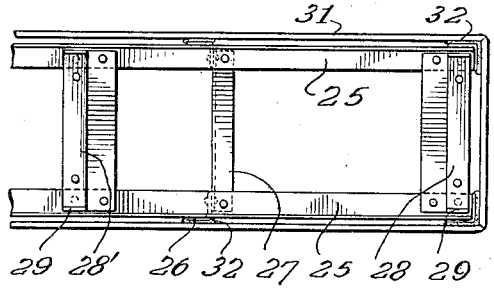

Aug. 16, 1938.　　　　　F. O. GUTH　　　　　2,127,213
PORTABLE STARTING STALL FOR RACE TRACKS
Filed March 4, 1935　　　3 Sheets-Sheet 3
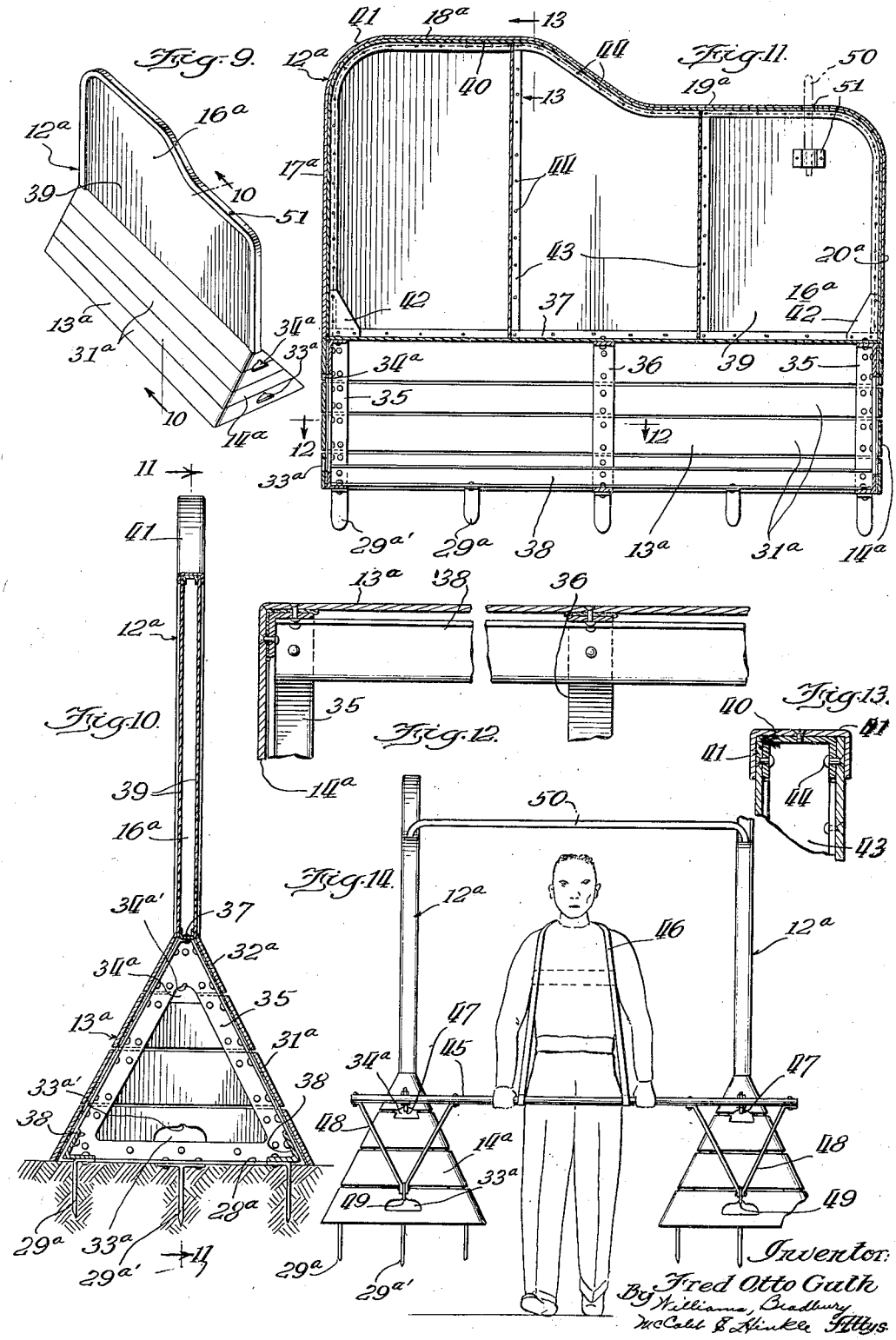

Patented Aug. 16, 1938

2,127,213

UNITED STATES PATENT OFFICE 2,127,213

PORTABLE STARTING STALL FOR RACE TRACKS

Fred Otto Guth, Chicago, Ill., assignor, by mesne assignments, to Pylodyne Corporation, Chicago, Ill., a corporation of Illinois Application March 4, 1935, Serial No. 9,262

13 Claims. (Cl. 119—15.5)

My invention relates to portable starting stalls for horse race tracks. In this class of starting stalls the stall defining structure is temporarily placed across the track at the starting point and then removed before the horses come around to pass the starting point again.

Briefly described, my starting stalls as here shown are formed by separate, independent, self-supporting, and readily removable pylons arranged at spaced intervals across the track at the starting line in lieu of the usual built-in stall partitions or the usual gang stalls, that is, stall partitions carried by a portable superframe. Each pylon is about the length of a horse's body, but in height comes below the stirrups. The sides slope upwardly and inwardly from a broad supporting bottom, and above the top of the pylon proper is a vertical central partition extension, which may be either a rail or a panel. Thereby the horse's foot room between adjacent pylons is narrow enough to keep the horse straight and centered between the pylons, but at the same time there is ample clearance toward the top for the horse's body and the jockey's legs. On its bottom the pylon carries anchoring spikes.

The objects and advantages of my invention may be classified as follows:

*As to the jockey:* His legs are protected against contacting the stall partition as well as against contacting the adjacent horse or jockey; he has a free and unobstructed view in all directions; the assistant starter is required by the nature of the stalls to stand forwardly thereof where the jockey can easily observe all his actions; the horse is easily guided into the stall; and there is no elevated frame structure, which might be hit by the jockey's head or body if the horse rears.

*As to the assistant starter:* The pylons which constitute the partitions between stalls serve as safety islands for the assistant starter, who stands on the track, and because of the width of the pylon at its forward end the assistant starter is protected from the horse he is holding as well as from the adjacent horse; the front end of the pylon affords a substantial abutment for the assistant starter, which he can use to keep himself from being pulled back into the stall by a retreating horse, so that the assistant starter is not maneuvered into the stall between the partition and the horse, where he may be injured; he is kept in front of the horse and in plain view of all the spectators so that his actions are entirely above suspicion; and the horses, when running out from the stalls, are headed straight and evenly spaced apart, so that no assistant starter is in danger of being crushed between two emerging horses.

*As to the horse:* "Burning" of the sides of the horse by scraping against a partition is prevented by the sloping side of the pylon, which insures an ample clearance for the lateral overhang of the body beyond the hoofs; there is no structure over which the horse must pass in entering or leaving the stall, and hence no danger of his stumbling thereon or shying on account thereof; there is no overhead structure and no shadow cast thereby, which would tend to make the horse shy on entering or leaving the stall; the kicking of the partition by a neighboring horse will not frigthen one horse because the pylon is relatively sound-proof; if the horse steps or kicks onto the side of the pylon, its steep slope directs his hoof down to the ground, avoiding injury or stumbling; the sides of the pylon always extend all of the way down to the track regardless of the crown or bank contour of the track, and hence there are never gaps between the sides and the surface of the track between which the horse's hoof may become wedged and the foot thereby injured; the form of the stalls gives the assistant starter no occasion to be between the horse and one of the partitions, which is likely to give the horse a poor start and direct him toward an adjacent horse, and which has often prompted assistant starters to kick the legs of an unruly horse to get it into proper position; the ground space available to the horses' feet between the partitions is ample for the characteristic spreading of the horses' feet in getting an effective start, but still sufficiently narrow to prevent the horses getting out of substantial parallelism with the partitions; and the several horses are well spaced apart, as they start from the stalls.

*As to the racing plant:* The starting stalls are extremely flexible as to arrangement; they can, if necessary, be narrow or wider to lend themselves to a larger or smaller number of horses; they can be set across a starting line at any point on the track to give any desired distance to the race and, if required, they can be set in staggered arrangement to equalize the running distances in those instances where the starting point is so close to the curved portion of the track as to leave little or no initial straight-away; the pylons are not injurious to the track itself; they do not result in some portions of the track being wetter than others because, being placed on the track for only short intervals, their shadows cannot substantially retard drying of the track; there are no moving parts, and hence no danger from failure of operation which might result in failure to remove the stalls before the horses come past again; no adjustments have to be made to fit the partitions to the contour of the crown or bank of the track as in the instance of partitions suspended from overhead supporting frames; they are very quickly and readily set or removed and are convenient to carry off the track, whereby the track may be cleared very promptly after the start; they require no runways to or from the track nor ramps in the instances of filled tracks, and they require no large gates for their removal from the track; there is no injury to tracks in removing the stalls, as, for instance, by the load on the wheels of frame supported gang partitions sinking into a wet track; my stalls may be removed by the usual plentiful track labor, not requiring teams of horses or tractors as with gang stalls; they do not interfere with the full visibility of the jockeys and the assistant starters when in use; and because of their small size they do not interfere with visibility from any portion of the field while temporarily stored alongside the track when not in actual use; being small and compact units, they are readily stored between racing seasons and may readily be moved by truck to other race tracks, as distinguished from the awkwardness of transporting the huge wheeled bridge structure or gang stalls now in general use which, for transportation to other tracks, require special police permit and police escorts therefor.

*As to the stall itself:* The pylons are light but durable and sturdy; while independent and readily removable, they are securely anchored to the track against tipping and sliding, and of substantial and broad base to give them a firm footing; their centers of gravity are low, which further prevent their tipping; they are well ventilated, which prevents the rotting of the wooden portions and minimizes the increase in weight due to wetness; and their cost of manufacture is but a small fraction of that of gang stalls, and because they have no working parts they are long lived and require no maintenance other than occasional painting and the occasional sharpening of the anchoring spikes or prongs.

*As to the breeders:* Because of the low cost, simplicity, portability and flexibility (as regards the number of stalls) it is very convenient and feasible for breeders and trainers to school their horses with identically the same starting stalls that the horses will use on the race track, while with gang stalls this is practically prohibitive except for the more prosperous stables, and puts the smaller stables under a great and unsportsmanly handicap in entering their horses in races started from these strange formidable gang stalls.

My invention is also concerned with a carrying device which serves the two-fold purpose of carrying and spacing apart pairs of pylons for use in carrying them to and from the track.

The foregoing, together with further objects, features and advantages of my invention are set forth in the following description of a specific embodiment thereof and illustrated in the accompanying drawings, wherein:

Fig. 1 is a perspective view looking backwardly along the track and showing a plurality of spaced pylons arranged in a row across the track at the starting point;

Fig. 2 is a side elevation of a pylon looking toward the inside of the track and showing the relative positions of the horse and jockey;

Fig. 3 is a front elevation of two of the pylons defining the stall, with the horse, jockey and assistant starter shown in position;

Fig. 4 is a vertical longitudinal medial section through the end of the pylon, taken on the line 4—4 of Fig. 3;

Fig. 5 is a transverse vertical section through one of the pylons, taken on the line 5—5 of Fig. 4;

Fig. 6 is a bottom view of the forward end of one of the pylons;

Fig. 7 is a transverse vertical section through the upper end of one of the pylons, taken on the line 7—7 of Fig. 4;

Fig. 8 is a detail plan section taken on the line 8—8 of Fig. 4, showing the attachment of one of the upright frame members to one of the side slats;

Fig. 9 is a perspective view of a modified form of pylon;

Fig. 10 is a transverse vertical section of the pylon of Fig. 9, looking rearwardly along the line 10—10 of Fig. 9;

Fig. 11 is a longitudinal vertical section of the pylon of Fig. 9, taken on the line 11—11 of Fig. 10;

Fig. 12 is a fragmentary plan section of the pylon of Fig. 9, taken on the line 12—12 of Fig. 11;

Fig. 13 is a fragmentary vertical transverse section of the pylon of Fig. 9, taken on the line 13—13 of Fig. 11; and Fig. 14 is a front elevation of a pair of pylons of the form of Fig. 9, showing a carrying and spacing attachment therefor.

In Fig. 1, I have illustrated a track 10 and an inside fence 11, with a plurality of pylons arranged in spaced relation across the track along the starting line. In this particular illustration five pylons are providing starting stalls preferably for four horses, although I contemplate that in some instances, if desired, the space between a pylon and the fence may be utilized as a starting stall, and also a horse may be placed without the outermost pylon or between the outermost pylon and the fence.

As will best be seen from Figs. 2 and 3, the pylons 12 are of truncated pyramidal form, which in plan is a greatly elongated rectangle. Each pylon comprises a pair of sloping lateral walls 13 and end walls 14, which preferably also are inclined as shown. The generally pyramidal form of the pylon is truncated by a flat top 15. In height the pylon is preferably somewhat lower than the height of the stirrup so that the jockey's legs are wholly above the top side 15 and clear of the side wall 14 to guard the jockey's leg, when he is properly mounted, from being caught between the lateral wall and the horse.

In length the pylon is preferably approximately that of the body of the horse so that when the horse is properly positioned beside the pylon it will be impossible for him to kick or otherwise disturb a neighboring horse. The sloping lateral walls 13 are disposed at an angle which is preferably determined by the overhang of the horse's body laterally beyond the normal position of his feet. The top 15 is of a width which provides ample clearance, laterally beyond the rail 16 for the stirrup and the jockey's feet, and this dimension together with the sloping of the lateral walls provides a base of substantial width which gives the pylon a substantial footing against being rocked or tipped over.

The rail 16 is preferably added to the top of the pylon to serve the two-fold purpose of guiding the horse into the stall and of aiding in keeping adjacent horses and their jockeys apart.

The rail 16 may be formed from tubular or pipe stock. It preferably comprises a rearward vertical or riser portion 17 suitably secured at its lower end to the top wall 15 by the usual pipe flange fitting, turning forwardly into an elevated horizontal portion 18, then obliquely downwardly to a lower horizontal portion 19, and finally turning down into the forward riser 20. The rearward riser 17, and the rearward horizontal portion 18, the latter being at about the height of the horse's nose, serve to guide the horse into the stall and avoid confusion on the part of the horse in entering the stall, due to the pylon proper being somewhat below his normal line of vision. The lower forward horizontal portion 19, being below the knees of the jockey, permits a greater freedom of movement laterally and prevents his knee being pressed against the rail if the horse moves sidewise against the pylon. An intermediate reinforcing riser 21 may be provided, if desired. The low or forward horizontal portion 19 of the rail, however, serves to aid in keeping the adjacent mounted jockeys apart in the event their horses move laterally against the intervening pylon.

Each pylon is preferably framed internally by a structure which for lightness and strength I choose to build up from Duralumin strips of angle cross section. This framework comprises uprights 22 at the insides of the four corners and disposed at angles conforming to the slopes of the sides and ends of the pylon. These are joined at their tops by gusset plates 23 to the ends of horizontally extending frame rails 24 extending within the upper lateral edges of the pylons, and at their bottoms to lower lateral frame rails 25. Intermediate lateral uprights 26 extend between the upper and lower rails 24 and 25 at the respective sides.

The bottom rails 25 are spaced apart by tie bars 27 at the bottoms of the uprights 26. The bottom rails 25 are also spaced apart at their ends by flat strip tie bars 28 which at their ends are turned downwardly to form prongs 29. An intermediate tie bar 28' also having prongs 29 is preferably provided as shown in Fig. 4. Opposed uprights are united at their upper ends by transverse tie bars 30. The several component parts of the frame described, together with the incidental attaching and reinforcing plates, are secured together by spot welding or the rivets shown. If desired, the lower rails and cross members may be of relatively heavy steel to lower the center of gravity of the pylon.

For surfacing this light but rigid metal frame to provide the lateral and end walls of the pylon, instead of using one piece of panel stock of wood or metal for each side, I prefer to use the horizontal slats 31. These slats are preferably made from plywood to prevent their warping and to secure considerable strength in proportion to weight. The slats are secured or bolted to the several uprights of the frame. The top wall 15 preferably comprises a single board of plywood.

Ventilating spaces are left between the slats 31 to enable the wood parts to dry out quickly if they become wet and to aid in preventing rotting of the wood or corrosion of the metal frame. Strips 32 of waterproof felt or other sound deadening material are preferably inserted between the frame members and slats to dampen vibrations in the slat and to prevent sound from being carried across the pylon in the event a horse kicks one of the slats.

The prongs 29 are somewhat sharpened on their lower ends and also along their side edges, giving the prongs a double-convex section. They are preferably long enough to get a firm anchorage in the solid soil of the track. They serve the primary purpose of preventing shifting of the pylons. While the prongs do not offer much resistance to direct upward lifting of the pylon, they afford considerable resistance to the rocking of the pylon about a bottom lateral edge, because such rocking motion would give each prong a lateral component of movement which would cause the prong to bind more tightly in the track. The prongs 29 are sufficiently narrow in cross section to avoid leaving any objectionable holes in the track. They can be pushed into the ordinary track without requiring much force. This may be facilitated by toe holes 33 in the end walls whereby the attendant may put his foot on the end of the bottom frame and use his weight for pushing the prongs into the track. The prongs are of sufficient length to pass through the ordinary soft layer of the wet track and get an anchorage in the firmer ground therebeneath. Where the track is especially muddy, and therefore a more secure anchorage is required, the bottom edges of the lowermost slats, which would normally lie upon the top surface of the dry track, penetrate into the mud, and to a certain extent the mud works around the horizontal flanges of the bottom rails 25 and around the strips 28 and 28', which tend further to hold the pylons against being lifted from the track.

For easily lifting and carrying the pylon, one of the slats at each end is notched as at 34 to provide a convenient hand grip. These hand grips together with the rail 16 enable two attendants to lift the pylon and carry it either in upright or horizontal position; or, if desired, one attendant may hold the hand grip of one pylon with one hand and the hand grip of another pylon with the other hand, and another attendant at the other end do likewise, whereby two attendants may easily lift and carry away two pylons at a time. For compact storage or compact loading on to trucks for transportation, the pylons may be loaded on their sides and alternated so that their wedge shapes preserve a straight stack.

On the third sheet of the drawings, comprising Figs. 9 to 14, inclusive, I have shown a modified form of pylon 12a having lateral walls 13a and end walls 14a which form a prism of equilateral vertical cross section, the very slightly truncated top wall 15a continuing upwardly as a panel 16a which serves much the same function as the rail 16 in the form previously described.

Here the pylon proper or triangular prism is framed internally by triangular end frame members 35, which may be of cast metal of angle cross section, and between the end frames by an intermediate strap frame 36. The frames 35 and 36 are interconnected at their upper ends by a longitudinal channel 37 and at their bottom lateral edges by bottom rails 38 of acute angle cross section. To the under sides of the end frames 35 and the intermediate frame 36 are secured bars 28a having at their ends downwardly projecting prongs 29a. If desired, central prongs 29a' may also be provided. The ends of the inclined sides of the pylons are surfaced by plywood slats 31a, sound insulated from the frame by strips 32a as described in the previous form.

The partition panel 16a may be of framed woven wire, but, as here shown, is formed by a pair of spaced surfacing panel sheets 39 of sheet wood composition material framed by an inner marginal channel 40 and an outer marginal channel 41 arranged, as shown in the detail of Fig. 13, with their webs secured together by screws, bolts, rivets or the like, and their side flanges spaced apart and embracing the edges of the panel sheets. The panel framing channels 40 and 41 extend from one end of the channel 37 upwardly, as at 17a, then horizontally forwardly, as at 18a, then obliquely forwardly and downwardly to a lower horizontal portion 19a, and then downwardly at the front, as at 20a, to the forward end of the channel 37. The attachment of the ends of the channels 40 and 41 to the ends of the horizontal channel 37 is effected by gussets 42. Intermediate upright internal channels 43 of stock similar to the channels 40 are provided for further reinforcement of the panel. The panel is secured to the inner channels 40 and 43 at intervals by screws or rivets 44.

Foot holes 33a and hand holes 34a are provided in the end walls.

In transverse section, the pylon, below the panel 16a, is substantially an equilateral triangle, and as here shown, would be 24 inches on the base. This represents a very satisfactory balancing of the three factors: Center of gravity, bracing of the panel, and slope of the sides 13a. A triangle of greater height would raise the center of gravity and make the pylon more susceptible to rocking or tipping over. The sloping side 13a should also be kept below the height of the stirrups so that the jockey is given the full benefit of the width between the panels 16a. If the triangle were made lower, the panel 16a would not be so well braced in reference to the base, and the sloping sides 13a, being less inclined, would not so well direct a horse's hoof downwardly to the track.

The width of the base of the pylon is determined in part by the breadth required for preventing tipping and in part by the width required for the exposed track between pylons to center the horse and keep him in line by restricting the area whereon he can place his feet.

In Fig. 14, I have illustrated a carrying and spacing device for the pylons, and have shown it as applied to the form of sheet 3, although it may as easily be applied to the form of sheets 1 and 2. This carrying and spacing device consists of a horizontal bar 45 supported by a shoulder strap 46 or by the attendant's hands or both. Toward each end the bar 45 carries a hook 47 which engages a notch 34a' in the hand hole 34a, whereby the hook may directly engage the end frame member 35. The hooks 47 are spaced apart by a distance equal to the center to center spacing of the pylons when installed on the track. By the use of these carrying bars 45, one held by an attendant at the front and the other held by another attendant at the back of a pair of pylons, the two pylons may be carried in spaced relation and set down in proper spaced relation on the track. When the second pair is set down a third attendant may measure the proper distance out from the adjacent pylon of the first pair, for determining the position of the second pair. If the pylons are held merely by the hooks 47, there is some danger that the pylons will swing about the hooks as pivots, and when set down they may not be accurately spaced after the bar 45 is removed. To prevent this winging, I provide a depending sub-frame 48 at each end of the bar 45 and carrying a lower hook 49, which engages a notch 33a' in the foot hole 33a. In this way the end of each pylon is engaged at two spaced points to prevent swinging. This has the effect of holding the vertical center lines of the two pylons parallel with each other and at right angles to the bar 45.

Intsead of, or in addition to, the hooks 49, for preventing swinging of the pylons or otherwise for spacing them, a spacing member 50, illustrated in Fig. 14, may be used, the ends being bent downwardly and entering sockets 51 in the panel 16a.

While I have disclosed these specific embodiments of my invention, I contemplate that many changes may be made therein without departing from the spirit or scope of the invention.

I claim:

1. As one of a plurality of similar devices which, placed side by side in spaced relation across a race track form upwardly unobstructed starting stalls for the horses, an independent self-supporting readily removable portable pylon of elongated plan section and in length about the length of the body of a horse, having lateral sides inclined upwardly and inwardly from a wide bottom and terminating below stirrup height, the pylon being supported wholly and directly by the track and from its bottom and wholly within the perimeter thereof and being independent of any structure extending higher than the head of the horse.

2. A set of starting stalls for a horse race track comprising a plurality of stall-forming pylons arranged in side by side parallel spaced relation across the track, each pylon being an independent, self-supporting unit having a supporting bottom resting upon the track and side walls inclined upwardly and inwardly from the respective lateral edges of the bottom, the pylons being severally removable from the track, the pylons being independent of any structure toward their forward ends extending higher than the heads of the horses.

3. A set of starting stalls for a horse race track comprising a plurality of pylons arranged in side by side parallel spaced relation across the track, each pylon being an independent, self-supporting unit having a supporting bottom resting upon the track and side walls including exposed portions inclined upwardly and inwardly from the respective lateral edges of the bottom, at an angle in the order of 60 to 70 degrees to the track, the pylons being severally removable from the track and terminating short of the height of the eye level of the horses.

4. As one of a set of similar starting stall forming devices for race horses, a pylon having an elongated rectangular bottom, side walls extending from the respective lateral edges of the bottom upwardly and inwardly to a height less than stirrup height, a thin partition extending centrally thereabove and terminating below the eye height of the horses, and prongs extending downwardly from the bottom for removably penetrating the track and together with the surface of the bottom constituting the sole support for the pylon.

5. As one of a set of similar unit devices placed in spaced parallel arrangement across a race track to form starting stalls therebetween for horses, an independent, self-supporting, self-contained, portable and readily removable pylon of approximately horse's length, comprising a broad track-engaging supporting bottom having lateral edges, lateral side walls extending upwardly and inwardly from the lateral edges of the bottom at angles in the order of 60 degrees to the track and terminating at a height below stirrup height, and a longitudinally disposed vertical partition, comprising a panel and a marginal frame therefor, extending upwardly from the inclined side walls to, and terminating at, a height in the order of stirrup height, the fore portion of the pylon being free from obstructive structure above the upper edge of the partition.

6. As one of a set of similar unit devices set in spaced parallel arrangement across a race track to form starting stalls therebetween for horses, a self-supporting pylon comprising a broad track-engaging bottom having lateral edges, lateral side walls extending upwardly and inwardly from the lateral edges of the bottom to a height below stirrup height, and a longitudinally disposed vertical partition extending upwardly from the inclined side walls beyond a height in the order of stirrup height but terminating below the eye level of the horses.

7. In combination with a race track, a set of three or more portable pylons placed upon the track in parallel side-by-side spaced-apart arrangement across the track to form starting stalls between adjacent pylons, the set of pylons being supported solely by removable engagement of their bottoms with the track, each pylon being wide at the bottom and narrow at the height of the horses' bodies, the bottoms being spaced apart to expose unobstructed areas of the track, each wide enough for a horse to stand on and unobstructedly communicating with the track forwardly and rearwardly of the pylons, the pylons terminating below eye level of the horses and toward their forward portions being free of overhead structure.

8. A stall-defining unit of the class described, comprising a base portion in the form of a horizontally disposed triangular prism, one side of which is adapted to rest upon a race track and thereby support the unit, and a vertically disposed partition extending along the apex of the prism and at the fore part of the unit extending upwardly from the apex to, but not above, a height in the order of stirrup height.

9. A stall-defining unit of the class described, comprising a base portion in the form of a horizontally disposed triangular prism, one side of which constitutes the bottom and rests upon the track and carries depending prongs for penetration of the track, the bottom constituting the sole support for the unit, and a vertically disposed partition extending along the apex of the prism and extending upwardly therefrom and terminating below the eye level of the horses, the unit being independent of any structure above the partition.

10. A starting stall-defining unit of the class described for removable placement upon a race track, comprising a pylon unconnected with any other pylon having at its forward and rearward ends opposed vertically disposed triangular frame members, horizontally extending frame rails connecting the corresponding corners of the triangular frame members, and together with the triangular frame members constituting a frame, the triangular frame members being set with their lower sides parallel with and adjacent the track, depending track penetrating prongs carried by the frame, upwardly and inwardly inclined side walls carried by the frame and extending between the triangular frame members, and a vertically disposed partition extending along the apex of the frame and extending upwardly therefrom.

11. The combination with a pair of spaced-apart normally independent pylons of the class described having broad bases and side walls extending upwardly and inwardly therefrom, of carrying and spacing apparatus therefor comprising at one end of the pylons, a horizontally disposed carrying bar extending across adjacent ends of the pylons, and cooperating engaging members on the ends of the carrying bar and the ends of the pylons whereby the bar supports and spaces the pylons.

12. The combination with a pair of spaced-apart normally independent pylons of the class described having broad bases and side walls extending upwardly and inwardly therefrom, of carrying and spacing apparatus therefor comprising at one end of the pylons, a horizontally disposed carrying bar extending across adjacent ends of the pylons, cooperating engaging members on the ends of the carrying bar and the ends of the pylons whereby the bar supports and spaces the pylons, and a shoulder yoke for the bar for holding the bar at substantially hip height.

13. The combination with a pair of spaced-apart normally independent pylons of the class described having broad bases and side walls extending upwardly and inwardly therefrom, of carrying and spacing apparatus therefor comprising at one end of the pylons, a horizontally disposed carrying bar extending across adjacent ends of the pylons, cooperating engaging members on the ends of the carrying bar and the end of the pylons whereby the bar supports and spaces the pylons, and another set of cooperating engaging members on the bar and on the ends of the pylons respectively removed from those of the first set for preventing swinging of the pylons in reference to the bar.

FRED OTTO GUTH.